(12) United States Patent
Flotte et al.

(10) Patent No.: US 9,170,858 B2
(45) Date of Patent: Oct. 27, 2015

(54) OPTIMIZED TASK PROCESSING METHOD AND DEVICE FOR AN FWS

(75) Inventors: Laurent Flotte, Aurade (FR); Fabien Guilley, Merenvielle (FR); Nicolas Valot, Plaisance du Touch (FR)

(73) Assignee: Thales, Courbevoie (FR)

( * ) Notice: Subject to any disclaimer, the term of this patent is extended or adjusted under 35 U.S.C. 154(b) by 625 days.

(21) Appl. No.: 13/491,779

(22) Filed: Jun. 8, 2012

(65) Prior Publication Data
US 2012/0316705 A1    Dec. 13, 2012

(30) Foreign Application Priority Data
Jun. 10, 2011  (FR) ...................................... 11 01784

(51) Int. Cl.
G06F 9/54    (2006.01)
G05D 1/00    (2006.01)
G05B 23/02   (2006.01)

(52) U.S. Cl.
CPC ............ G06F 9/542 (2013.01); G05B 23/0272 (2013.01); G05D 1/0055 (2013.01); G05D 1/0077 (2013.01)

(58) Field of Classification Search
CPC ............ G05D 1/0055; G05B 23/0221; G05B 23/0262; G05B 23/0264; G05B 23/0272; G06F 9/542
USPC .............. 701/3, 9, 14, 29.1, 31.6, 31.7, 31.8, 701/32.1, 32.8, 32.9, 33.6, 33.7
See application file for complete search history.

(56) References Cited

U.S. PATENT DOCUMENTS

| 2008/0150763 A1* | 6/2008 | Fontova et al. ............... 340/945 |
| 2008/0303833 A1* | 12/2008 | Swift et al. .................... 345/505 |
| 2010/0066565 A1* | 3/2010 | Francois et al. .............. 340/963 |

FOREIGN PATENT DOCUMENTS

| FR | 2882141 A1 | 8/2006 |
| FR | 2908384 A1 | 5/2008 |
| FR | 2935818 A1 | 3/2010 |

OTHER PUBLICATIONS

A. Gamatie et al.: "The Signal Synchronous Multiclock Approach to the Design of Distributed Embedded Systems," IEEE Transactions on Parallel and Distributed Systems, IEEE Service Center, Los Alamitos, CA, US, vol. 21, No. 5, May 1, 2012, pp. 641-657.
Search Report of corresponding French Application No. 1101784 issued on Jan. 16, 2012.

* cited by examiner

*Primary Examiner* — Spencer Patton
(74) *Attorney, Agent, or Firm* — Baker & Hostetler LLP

(57) ABSTRACT

The subject of the present invention is a method for processing alerts by an avionic system FWS that makes it possible to optimize the processing of these alerts without unnecessarily consuming "processor time". The method according to the invention is characterized in that it consists in having processed, on each processing cycle of the processor of the FWS, only the operations relating to alerts for which the result has been modified since the preceding processing cycle.

2 Claims, 2 Drawing Sheets

OPTIMIZED TASK PROCESSING METHOD AND DEVICE FOR AN FWS

CROSS-REFERENCE TO RELATED APPLICATIONS

This application claims priority to foreign French patent application No. FR 11 01784, filed on Jun. 10, 2011, the disclosure of which is incorporated by reference in its entirety.

FIELD OF THE INVENTION

The present invention relates to an optimized task processing method and device for an FWS (Flight Warning System).

BACKGROUND ART

In the current avionics systems for managing alerts and procedures, commonly called FWS, the consumption of "processor time" (processor occupancy time in processing these alerts) is the same whatever the number of alerts detected. The worst case (presence of a large number of alerts that are unchanged, but processed "without any data" by the processor) is repeated each time, and at the present time there is no solution to this problem.

SUMMARY OF THE INVENTION

The subject of the present invention is a method for processing alerts by an avionic system FWS that makes it possible to optimize the processing of these alerts without unnecessarily consuming "processor time".

Also the subject of the present invention is a sequencing device for an aircraft FWS that enables this FWS to provide the same services as the known FWS systems in terms of alert detection latency, pilot action response latency, etc., or to improve them, while consuming as little processor time as possible and which is as inexpensive as possible.

The method according to the invention is characterized in that it consists in having processed, on each processing cycle of the processor of the FWS, only the operations relating to alerts for which the result has been modified since the preceding processing cycle.

According to a preferred implementation of the method of the invention, on each alert data refresh cycle, these refreshed data are compared to those received in the preceding cycle, and, if the refreshed datum is different from the preceding datum, a notification is sent to a sequencer which recovers, from a data library, the logical combinations needed to process this alert, performs the corresponding operations and transmits the result to an asynchronous alert display processor.

The device according to the invention comprises an input data decoding module, a dynamic logic tasks sequencer, a library of logical combinations data, a module for storing results of the logic operations and an asynchronous display processor.

BRIEF DESCRIPTION OF THE DRAWINGS

The present invention will be better understood on reading the detailed description of an embodiment, taken as a non-limiting example, and illustrated by the appended drawing, in which.

DETAILED DESCRIPTION OF THE INVENTION

Figure 1:
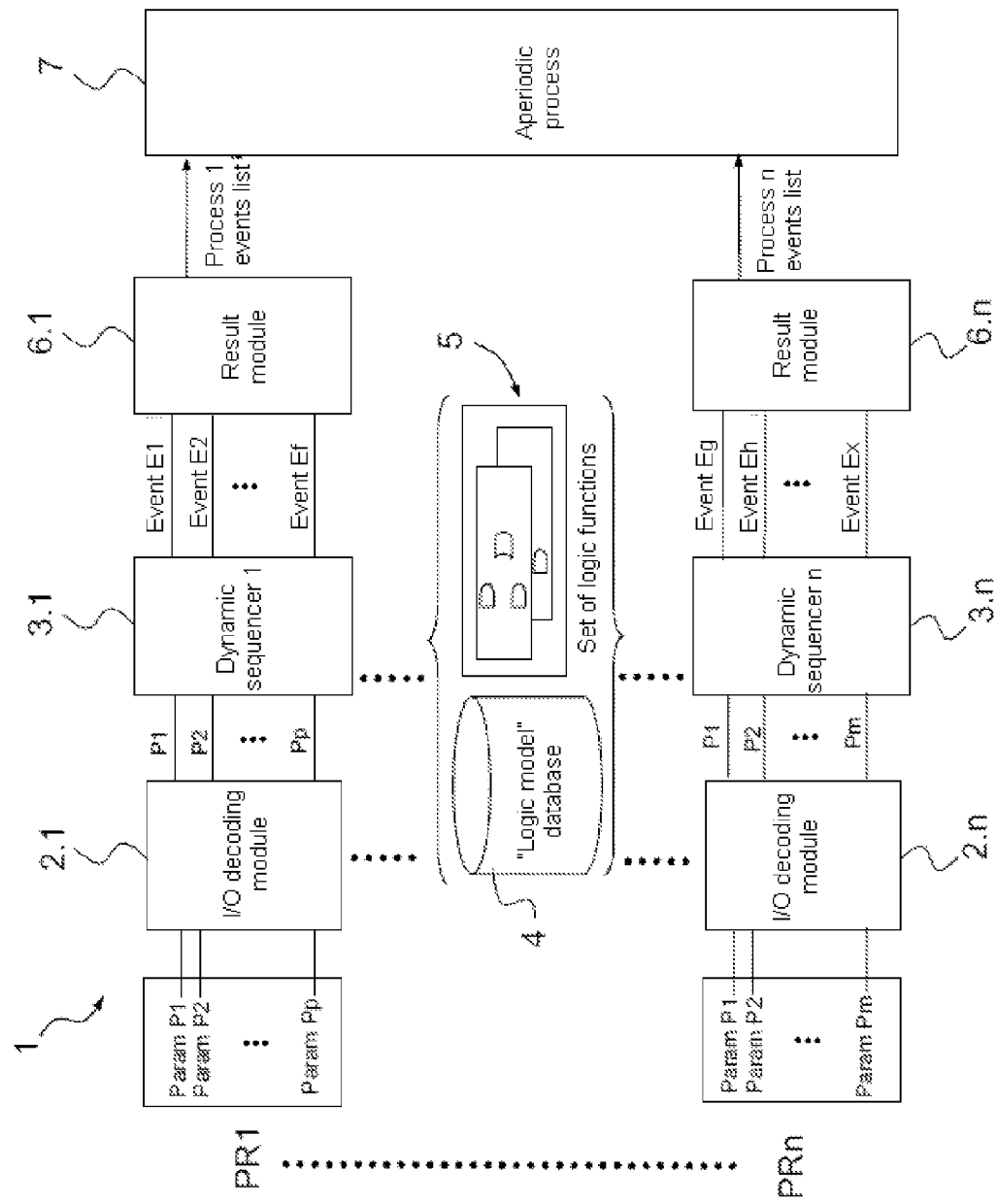
FIG. 1 is a simplified block diagram of a system for implementing the method of the invention.

The system 1 diagrammatically represented in FIG. 1 is intended for the processing of n different FWS alert processes, each of these processes implementing alert data (also here called parameters), of which some are common to at least some of the processes, and others are specific to particular processes. Thus, for example, as represented in FIG. 1, the first process PR1 processes the parameters P1, P2, ... Pp, and the process PRn of rank n processes the parameters P1, P2, ... Pm.

The system 1 mainly comprises, for each of the n processes PR1 to PRn that it processes (in FIG. 1, the modules relating to each process are represented on the same row): an input data decoding module (respectively 2.1 to 2.n) producing a state change indicator, a dynamic task sequencer working in real time (respectively 3.1 to 3.n), a database 4 which comprises a library of models of combinational logic functions, this database being common to all the processes. The sequencers extract therefrom each of the sets of logic functions 5 according to their needs (the database 4, and the sets 5 form only a part of one of the rows of process processing elements, but have been represented for convenience between rows). This library includes the dependencies between the different parameters processed. Thus, for example, in the diagram of FIG. 2, described in more detail below, the dependencies of L2 are L3 and L4. The system 1 then comprises, for each process, a results storage module (respectively 6.1 to 6.n). The modules 6.1 to 6.n receive from the sequencers (3.1 to 3.n respectively) event information items denoted, for example, E1, E2, ... , Ef for the process PR1 and Eg, Eh, ... , Ex for the process PRn. It should be noted that an event information item comprises its identifier and its value. For example, an alert arriving at an FWS comprises its identifier (of the type XXXX) and signals whether or not it is detected (value information for this alert). The outputs of the different modules (purely software) 6.1 to 6.n are linked to an aperiodically operating graphics processing computer 7, which is linked to a display device (not represented) presenting the alerts to the pilot in graphical form.

In detail, the functions handled by the different modules of the system 1 are as follows:

Each of the modules 2.1 to 2.n comprises a memory for storing the alert data and compares its input data, refreshed on each FWS computation cycle, with the data received in the preceding FWS computation cycle. If the refreshed data is different from the preceding one, it sends a notification to the sequencer.

Each sequencer 3.1 to 3.n successively carries out the following functions:

a. On receiving a notification (corresponding to a refreshed datum differing from the preceding datum) from the decoding module which is linked to it, the sequencer extracts, from the library of the database 4, the set 5 of the logic combinations to be recomputed (set relating to the functions involved in processing the modified alert), their associated priorities for processing by the sequencer and the group to which they belong, this group forming part of predefined groups in the database 4.

b. It inserts into the list of logic combinations to be executed those that it has just recovered. The position of the logic combinations that have just been inserted into the list depends on their priority and on their sequencing group (these are combination groups having the same priority).

c. It starts executing the logic combination at the top of the list. If the result of this combination is different from the preceding one, the sequencer executes the same sequence as above (at the point a then at the point b) to add the set of logic combinations to be re-executed in the list of logic combinations to be sequenced, and does so for each of the groups, which constitutes a chaining of the execution activities by dependency of the inputs, that is to say that this addition of logic combination happens if, and only if, the combination concerned is not already present in the list.

d. It positions the result of the executions of the logic combinations in the corresponding result module.

Figure 2:
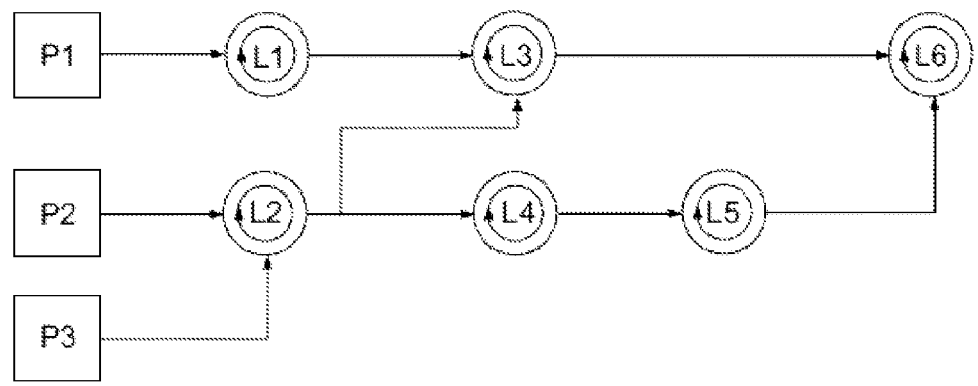
FIG. 2 is a simplified diagram of an example of sequencing performed by the system according to the present invention.

A highly simplified example of sequencing is described below with reference to the diagram of FIG. 2, in the case where the parameter P2 of the pathway of the process PR1 is modified. The different logic combinations implemented are denoted L1 to L6. Even though, to simplify the description, logic gates have been chosen here (in the case of an FWS, such logic functions constitute the great majority of the computation means, but it will be obvious to those skilled in the art how to generalize this reasoning), these logic combinations may be of different sorts: they may rely on real numbers, integers, etc., and be implemented by latches, confirmative circuits (in the latter case, it is obvious that an event must be added which forces the computation of these complex gates), etc.

The successive steps of this sequencing are:
1. Step 1
    a. substep 1a: L2 is extracted from the logic combinations model of the library of the database 4,
    b. substep 1b: L2 is added to the list of the logic combinations to be processed sequentially,
    c. substep 1c: L2 is executed (at the top of the list) and it is assumed that the result of this computation is different from the preceding one (the sequencer comprises, like each decoding module, a memory for storing the preceding result)
2. Step 2
    a. L3 and L4 are extracted from the library of the database 4,
    b. L3 and L4 are added to the list, one behind the other because it is assumed that they are of the same priority and therefore in the same sequencing group
    c. L3 is executed and the result is different from the preceding one.
3. Step 3
    a. L6 is extracted from the library 4,
    b. L6 is added to this list, behind L4 because it is of lower priority.
    c. L4 is executed and the result is different from the preceding one.
4. Step 4
    a. L5 is extracted from the library 4.
    b. L5 is added to the list, in front of L6 because it is of higher priority.
    c. L5 is executed and the result is different from the preceding one.
5. Step 4
    a. L6 is extracted from the library 4.
    b. L6 is added to the list, the list is not modified because L6 is already in this list.
    c. L6 is executed and the result is different from the preceding one.
    d. The result of L6 is transmitted to the result module.

If, for example, the parameter P3 is modified, the sequencing described above becomes:
    a. L2 is recomputed.
    b. The result of L2 is identical.
    c. End of process.

In this second case, a single logic combination has been recomputed instead of six (L1, L2, L3, L4, L5 and L6).

Library of Logic Combination Models (4):

The logic combination models, configurable on design (in the present case, the use of data flows is used to sequence the logic combinations), have, for each input datum, a list of informative triplets. Each triplet consists of:
    an identifier of the logic combination to be added to the processing list of the sequencer, because this combination depends on the result of the comparison of the input datum,
    a sequencing priority value for this logic combination,
    the group to which this logic combination belongs.

Set of Logic Functions (5):

The expression "logic functions" should be understood to mean functions that make it possible to produce different types of events:
    nominal change of operational state of the appliance (for example, entry into the approach phase towards an airport).
    abnormal malfunction of greater or lesser gravity (for example, loss of an engine) having to be signalled either by the "flight warning" or by a "display unit" type equipment item.

Figure 3:
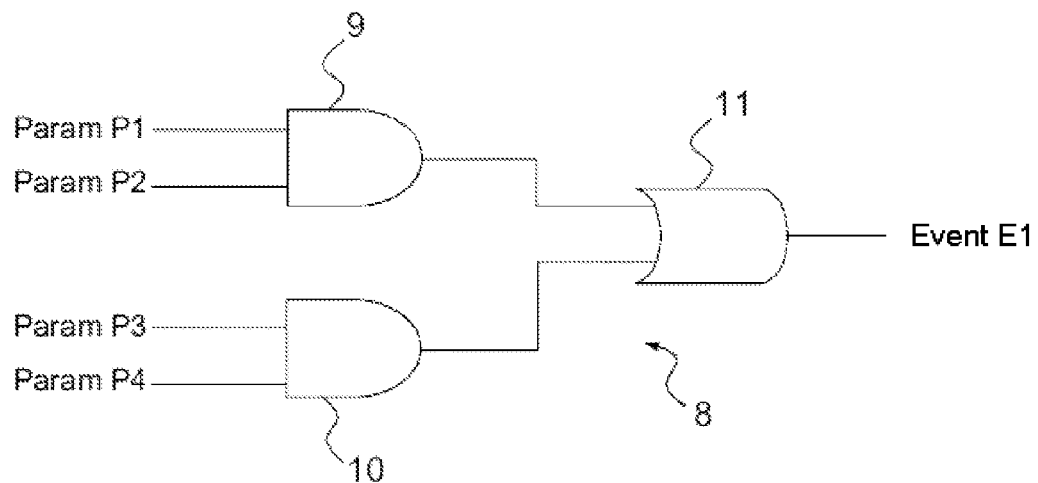
FIG. 3 is a diagram of an exemplary logic circuit used in the system according to the present invention.

These events are defined as being the result of a combination of logic operations between one or more of the parameters output by the onboard equipment items or by the sensors of the aircraft. FIG. 3 diagrammatically represents an example of a circuit 8 implementing an event-producing logic combination (AND logic gate). This circuit 8 comprises, at its input, two OR logic gates 9 and 10 each with two inputs, these inputs receiving, in this example, the parameters P1 to P4 respectively. The output of each of these two gates 9 and 10 is linked to an input of an OR logic gate 11. At the output of the gate 11, the event E1 is collected.

According to one embodiment of the invention, when the logic circuits use time-related conditions as confirmer that an alert has been taken into account, a modification is provided in order to ensure that the times are indeed observed because of the non-static sequencing of these logic combinations. The modification is, for example, one of the following two:
    modification of the library implementing the time cell. According to one implementation, the cell (synchronous) is called on each cycle and stores the expiry date of the confirmer in terms of number of cycles. In the case of an event scheduler, it is preferable to consider arming a confirmation "timer" implemented by a timer-type process A653, which is woken up on each timeout of the confirmer, and whose "handler" propagates the event by being inserted into the queue of the scheduler. The disarming of the timer is triggered by a reset event for the signal to be confirmed.
    use of an account running counter to the OS (operating system) of the FWS.

Result Modules (6.1 to 6.n):

The aim of each of these modules, of buffer memory type, is to recover the results of the different dynamic sequencers in order to then supply them to the asynchronous process of the FWS responsible for graphics processing.

It must be added that in the worst case (all the parameters are changed, all the alerts are lifted), all the logic functions are computed only once as is in a "conventional" FWS. The excess load in use of the processor linked to the decisions ("should I recompute a logic combination or not?") is negligible compared to the time needed to compute all the logic combinations.

Thus, by virtue of the invention, it is possible to have time allotted to the aperiodic process that is much smaller than that allotted in the conventional case and therefore processing time by the processor in rendering the same service is saved.

The invention claimed is:

1. An alert processing device for an avionic Flight Warning System (FWS) for managing alerts and procedures, the system comprising:
   groups of alerts predefined by logic functions applied to alert parameters, and
   means for implementing, on each of a plurality of alert computation cycles:
   calculating a value of each alert parameter;
   comparing the value calculated for each alert parameter with a value of the alert parameter on a preceding cycle;
   if the comparing determines the value is different, identifying:
      an alert group to which the alert parameter belongs;
      the logic functions involved in processing an alert; and
      an alert processing priority;
   executing the identified logic functions according to respective priority with the calculated parameter value; and
   storing a result obtained from the executing.

2. An alert processing device for an avionic Flight Warning System (FWS) for managing alerts and procedures, the system comprising:
   groups of alerts predefined by logic functions applied to alert parameters, and
   means for implementing, on each of a plurality of alert computation cycles:
   calculating a value of each alert parameter;
   comparing the value calculated for each alert parameter with a value of the alert parameter on a preceding cycle;
   if the comparing determines the value is different, identifying:
      an alert group to which the alert parameter belongs;
      the logic functions involved in processing an alert; and
      an alert processing priority;
   executing the identified logic functions according to respective priority with the calculated parameter value;
   storing a result obtained from the executing; and
   transmitting the result obtained from the executing to an asynchronous alert display processor.

* * * * *